Sept. 8, 1925.    1,552,950

H. B. PUSHEE

TIRE CONSTRUCTION

Filed July 7, 1922

Inventor
Harold B. Pushee

By
Attorney

Patented Sept. 8, 1925.

1,552,950

UNITED STATES PATENT OFFICE.

HAROLD B. PUSHEE, OF AKRON, OHIO, ASSIGNOR TO THE GENERAL TIRE AND RUBBER COMPANY, OF AKRON, OHIO, A CORPORATION OF OHIO.

TIRE CONSTRUCTION.

Application filed July 7, 1922. Serial No. 573,266.

*To all whom it may concern:*

Be it known that I, HAROLD B. PUSHEE, a citizen of the United States, residing at Akron, in the county of Summit, State of Ohio, have invented certain new and useful Improvements in Tire Construction, of which the following is a specification.

This invention relates to the manufacture of pneumatic tires of standard construction, except in so far as will be noted from an understanding of the invention. In tires of this type it was early found to be necessary to add a breaker strip and, as for as known to me, it has since been essential to provide a breaker strip between the tread of the tire and the cushion. The breaker strip is a layer of heavy fabric which is usually applied to the under side of the tread and extends for a short distance on either side of the center line of the tire. This strip is usually a loosely woven fabric and its function is believed to be to assist in the union of the tread to the carcass, and also to assist in the transmission of torque about the tire and distribution of shocks throughout the carcass. While the theory of the breaker is that it assists in the union of the tread and the cushion, it nevertheless, owing to the grinding action of the tread, will often break up or disintegrate and actually cause separation of the tread.

The theories relative to the breaker strip are not altogether proven, and there is considerable question as to the exact functions of the breaker strip, but nevertheless, it has never been possible, prior to my invention, to construct commercially successful and practical tires without the inclusion of a breaker strip, which would give the large mileage which may be obtained by the use of my invention.

By my invention, however, it is possible and entirely practical to construct a tire without a breaker strip and the results of my studies and experiments have shown that, when a tire is constructed in the manner herein shown and described, it is possible to apply the tread directly to the cushion or carcass of the tire without the interposition of the breaker strip or an equivalent construction and obtain a better tire.

It is obvious that such an improvement over the prior practice is a decided advance and as tires constructed in accordance with the showing herewith have given large mileage and have otherwise proven satisfactory, I believe that the tire herein shown is a superior construction over previous tires.

In the drawings is shown one form of tire which embodies the essential features of the invention, it being obvious that, having explained my invention, other embodiments thereof may be constructed without sacrificing any of the essential features thereof or without departing from the invention as set forth in the claims appended hereto.

Figure 1:
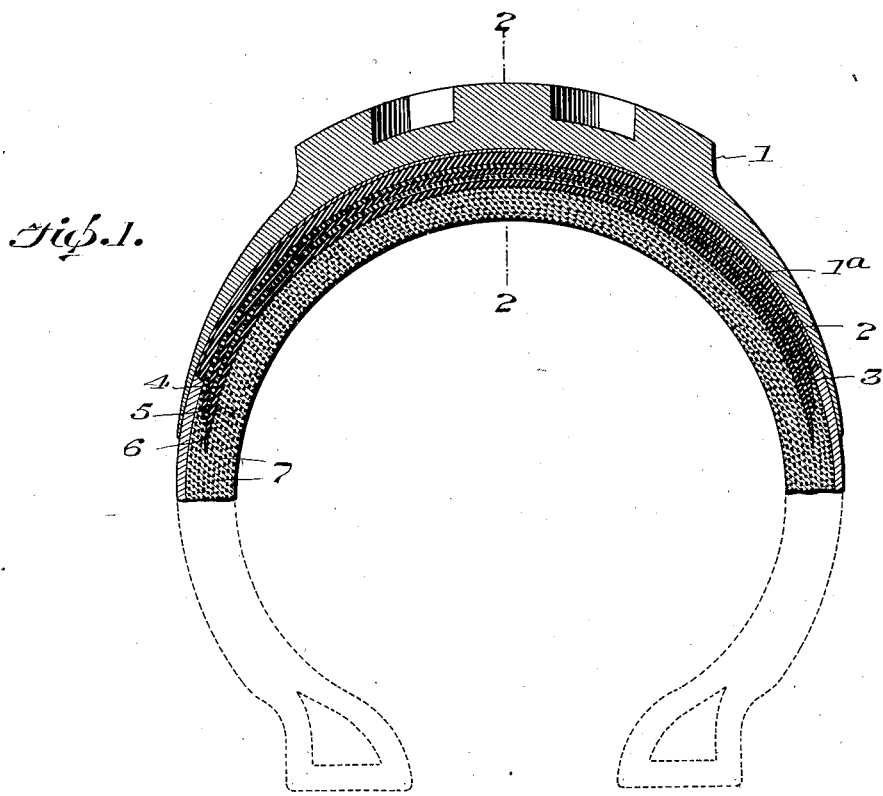
Figure 1 is a section through a tire casing constructed in accordance with my improved practice.
Figure 2:
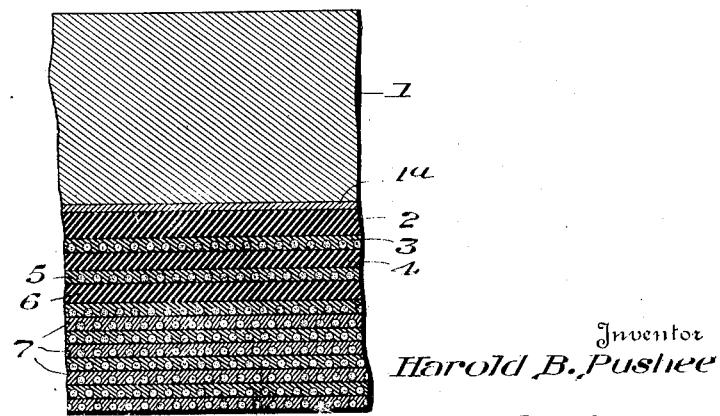
Figure 2 is an enlarged section at the tread, on the line 2—2 of Figure 1.

In the tire as shown, there is provided the usual tread 1 which is of a suitable tough, wear resisting rubber composition and which may be faced with an under tread or layer of intermediate stock 1$^a$ of slightly more resilient rubber. Immediately below the tread or intermediate stock is the layer of cushion rubber 2 which is a high grade resilient rubber adapted to cushion the blows from the tread. It will be noted here that the tire is peculiar and distinctive in that no breaker strip is found between the tread and the cushion. This is a radical departure from prior constructions, all of which have contained one or more breaker strips. In fact it was the opinion that no tire could be successful without a breaker strip.

Below the cushion layer is located the first fabric ply of the carcass. This is indicated by the numeral 3 and is given the usual friction and skim coats. It will be noted that the fabric is composed of a plurality of parallel cords as in the usual cord fabric, but that the cords all occupy the same plane and are spaced apart at greater distances than in the ordinary cord fabric. This type of fabric is an especial and unusual kind and differs from ordinary cord fabric in the position of the cords and in the open formation which allows the rubber to pass through and entirely surround and incase the cords.

If desired, below the first or outer ply of fabric is positioned a second layer of cushion rubber 4. Immediately below this cushion layer is another ply of cord fabric 5, which is in turn superposed over a third layer of cushion 6 below which are the several layers of fabric 7 which constitute the remainder of the carcass. The sidewalls of the tire are indicated by the numeral 8.

The showing of the fabric is somewhat exaggerated so as to make the invention clear, but it will be noted that by the open construction of the fabric the entire body of rubber in the tire is united and connected together, and I believe that it is because of this construction that I am enabled to dispense with the breaker strip. It will be further noted that every layer of cord fabric is thoroughly impregnated and coated with rubber which is done by frictioning and calendering in the usual calenders, although other means of obtaining the rubber coating may be employed.

The intermediate layers of cushion stock, 4 and 6, may or may not be used, or may be increased in number. In larger tires, this construction may be advisable in order to graduate off the action occurring between the tread and the carcass. The tire which is here shown contains ten plies of fabric, but the number of plies may be increased or diminished.

As stated above, the disclosed tire construction is the first one which has been made and used without a breaker strip and which would give mileage equal to or greater than that of the ordinary cord tire with a breaker strip. It has been in commercial use for a considerable period and has demonstrated that a breaker strip is not essential and may be dispensed with. The result obtained is believed to be attributable to the particular combination of elements as set forth in the claim, but I do not desire myself to be restricted to the exact form shown, as the construction may be varied within fair scope of the invention and the claim.

What I claim is:

In a pneumatic tire construction, a plurality of plies of cord fabric constituting the carcass of the tire, the outer ply of fabric extending from bead to bead and being spaced from the balance of the carcass by a layer of rubber of substantial thickness and a tread layer of rubber vulcanized to the carcass, the cords of the outer ply being spaced apart and surrounded by rubber whereby adhesion is maintained between the tread and the carcass and a breaker may be omitted.

HAROLD B. PUSHEE.